(12) United States Patent     (10) Patent No.:   US 12,657,895 B2

Beyer et al.     (45) Date of Patent:    Jun. 16, 2026

(54) TRAINING LARGE-SCALE VISION TRANSFORMER NEURAL NETWORKS

(71) Applicant: Google LLC, Mountain View, CA (US)

(72) Inventors: Lucas Klaus Beyer, Zurich (CH); Neil Matthew Tinmouth Houlsby, Zurich (CH); Alexander Kolesnikov, Zurich (CH); Xiaohua Zhai, Zurich (CH)

(73) Assignee: Google LLC, Mountain View, CA (US)

( * ) Notice: Subject to any disclaimer, the term of this patent is extended or adjusted under 35 U.S.C. 154(b) by 1052 days.

(21) Appl. No.: 17/829,227

(22) Filed: May 31, 2022

(65) Prior Publication Data

US 2022/0383630 A1     Dec. 1, 2022

Related U.S. Application Data

(60) Provisional application No. 63/194,900, filed on May 28, 2021.

(51) Int. Cl.
*G06V 10/82*     (2022.01)
*G06V 10/774*     (2022.01)

(52) U.S. Cl.
CPC .......... *G06V 10/82* (2022.01); *G06V 10/7747* (2022.01)

(58) Field of Classification Search
CPC .. G06V 10/82; G06V 10/7747; G06V 10/764; G06V 10/774; G06N 3/045; G06N 3/0499; G06N 3/09; G06N 3/096; G06N 3/063; G06N 3/084
See application file for complete search history.

(56) References Cited

U.S. PATENT DOCUMENTS

| | | | | |
|---|---|---|---|---|
| 2018/0357540 A1* | 12/2018 | Hwang | ................ | G06N 3/082 |
| 2021/0166131 A1* | 6/2021 | Pfau | ...................... | G06N 20/00 |
| 2024/0086716 A1* | 3/2024 | Su | ......................... | G06N 3/084 |

FOREIGN PATENT DOCUMENTS

| | | |
|---|---|---|
| CN | 111256906 A | 6/2020 |
| CN | 112069883 A | 12/2020 |
| CN | 112699991 A | 4/2021 |

OTHER PUBLICATIONS

Touvron et al. ("Training data-efficient image transformers &distillation through attention", Jan. 15, 2021) (Year: 2021).*
Loshchilov et al. ("Decoupled Weight Decay Regularization", Jan. 4, 2019) (Year: 2019).*
Bjorck et al. ("Understanding Decoupled and Early Weight Decay", 2021) (Year: 2021).*
Zhang et al. ("Three Mechanisms of Weight Decay Regularization", Oct. 29, 2018) (Year: 2018).*
Abnar et al., "Quantifying attention flow in transformers," Proceedings of the 58th Annual Meeting of the Association for Computational Linguistics, Jul. 2020, pp. 4190-4197.
Bachman et al., "Learning representations by maximizing mutual information across views," Proceedings of the 33rd International Conference on Neural Information Processing Systems, Dec. 2019, pp. 15535-15545.

(Continued)

*Primary Examiner* — Imad Kassim

(74) *Attorney, Agent, or Firm* — Fish & Richardson P.C.

(57) ABSTRACT

Methods, systems, and apparatus, including computer programs encoded on computer storage media, for training Vision Transformer (ViT) neural networks.

20 Claims, 5 Drawing Sheets

(56) References Cited

OTHER PUBLICATIONS

Baevski et al., "Adaptive input representations for neural language modeling," CoRR, arXiv:1809.10853, Sep. 28, 2018, 13 pages.

Barbu et al., "Objectnet: A large-scale bias-controlled dataset for pushing the limits of object recognition models," Proceedings of the 33rd International Conference on Neural Information Processing Systems, Dec. 2019, pp. 9453-9463.

Bello et al., "Attention augmented convolutional networks," Proceedings of the IEEE/CVF international conference on computer vision, Oct. 27-Nov. 2, 2019, pp. 3286-3295.

Bello et al., "Revisiting ResNets: Improved training and scaling strategies," Advances in Neural Information Processing Systems, Dec. 6, 2021, pp. 22614-22627.

Beyer et al., "Are we done with imagenet?" CoRR, arXiv:2006.07159, Jun. 12, 2020, 15 pages.

Brown et al., "Language models are few-shot learners," CoRR, arXiv:2005.14165v1, May 28, 2020, 72 pages.

Brown et al., "Language models are few-shot learners," Proceedings of the 34th International Conference on Neural Information Processing Systems, Dec. 2020, pp. 1877-1901.

Carion et al., "End-to-end object detection with transformers," European conference on computer vision, Aug. 23, 2020, pp. 213-229.

Chen et al., "A simple framework for contrastive learning of visual representations," International conference on machine learning, Nov. 21, 2020, pp. 1597-1607.

Chen et al., "Big self-supervised models are strong semi-supervised learners," Proceedings of the 34th International Conference on Neural Information Processing Systems, Dec. 2020, pp. 22243-22255.

Chen et al., "Generative pretraining from pixels," International conference on machine learning, Nov. 21, 2020, pp. 1691-1703.

Chen et al., "UNITER: Universal image-text representation learning," European conference on computer vision, Aug. 23, 2020, pp. 104-120.

Child et al., "Generating long sequences with sparse transformers," CoRR, arXiv:1904.10509, Apr. 23, 2019, 10 pages.

Cordonnier et al., "On the relationship between self-attention and convolutional layers," Eighth International Conference on Learning Representations, Apr. 26-30, 2020, 18 pages.

Cortes et al., "Support-vector networks," Machine learning, Sep. 1995, 20:273-297.

Deng et al., "ImageNet: A large-scale hierarchical image database," 2009 IEEE conference on computer vision and pattern recognition, Jun. 20, 2009, pp. 248-255.

Devlin et al., "Bert: Pre-training of deep bidirectional transformers for language understanding," CoRR, arXiv:1810.04805, Oct. 11, 2018, 16 pages.

Devlin et al., "BERT: Pre-training of deep bidirectional transformers for language understanding," Proceedings of the 2019 Conference of the North American Chapter of the Association for Computational Linguistics: Human Language Technologies, Jun. 2-7, 2019, pp. 4171-4186.

Djolonga et al., "On Robustness and Transferability of Convolutional Neural Networks," CoRR, preprint arXiv:2007.08558, Jul. 16, 2020, 24 pages.

Dosovitskiy et al., "An Image is Worth 16x16 Words: Transformers for Image Recognition at Scale," In International Conference on Learning Representations, Jun. 2021, 22 pages.

Extended European Search Report in European Appln. No. 22176029.1, dated Oct. 31, 2022, 9 pages.

Ghosh et al., "Context-aware attentive knowledge tracing," Proceedings of the 26th ACM SIGKDD international conference on knowledge discovery & data mining, Jul. 24, 2020, pp. 2330-2339.

Grill et al., "Bootstrap your own latent-a new approach to self-supervised learning," Proceedings of the 34th International Conference on Neural Information Processing Systems Dec. 2020, pp. 21271-21284.

He et al., "Deep residual learning for image recognition," Proceedings of the IEEE conference on computer vision and pattern recognition, Jun. 2016, pp. 770-778.

He et al., "Momentum contrast for unsupervised visual representation learning," 2020 IEEE/CVF Conference on Computer Vision and Pattern Recognition, Jun. 13-19, 2020, pp. 9729-9738.

Henaff et al., "Data-efficient image recognition with contrastive predictive coding," International conference on machine learning, Nov. 21, 2020, pp. 4182-4192.

Henighan et al., "Scaling laws for autoregressive generative modeling," CoRR, arXiv:2010.14701, Oct. 28, 2020, 37 pages.

Ho et al., "Axial attention in multidimensional transformers," CoRR, arXiv:1912.12180, Dec. 20, 2019, 11 pages.

Hu et al., "Relation networks for object detection," Proceedings of the IEEE conference on computer vision and pattern recognition, Jun. 2018, pp. 3588-3597.

Huang et al., CCNet: Criss-cross attention for semantic segmentation. Proceedings of the IEEE/CVF International Conference on Computer Vision, Oct. 27-Nov. 2, 2019, pp. 603-612.

Huang et al., "GPipe: Efficient training of giant neural networks using pipeline parallelism," Proceedings of the 33rd International Conference on Neural Information Processing Systems, Dec. 2019, pp. 103-112.

Ioffe et al., "Batch normalization: Accelerating deep network training by reducing internal covariate shift," International conference on machine learning, Jun. 1, 2015, pp. 448-456.

Jia et al., "Scaling up visual and vision-language representation learning with noisy text supervision," International conference on machine learning, Jul. 1, 2021, pp. 4904-4916.

Kaplan et al., "Scaling laws for neural language models," CoRR, arXiv:2001.08361, Jan. 23, 2020, 30 pages.

Kolesnikov et al., "Big transfer (BiT): General visual representation learning," Computer Vision—ECCV 2020: 16th European Conference, Aug. 2020, pp. 491-507.

Krizhevsky et al., "Imagenet classification with deep convolutional neural networks," Proceedings of the 25th International Conference on Neural Information Processing Systems, Dec. 2012, pp. 1097-1105.

Krizhevsky, "Learning multiple layers of features from tiny images," Technical report, Apr. 8, 2009, 60 pages.

LeCun et al., "Backpropagation applied to handwritten zip code recognition," Neural computation, Dec. 1989, 1(4):541-551.

Lee et al., "Set transformer: A framework for attention-based permutation-invariant neural networks," Proceedings of the 36th International Conference on Machine Learning, May 24, 2019, pp. 3744-3753.

Li et al., "VisualBERT: A simple and performant baseline for vision and language," CoRR, arXiv:1908.03557, Aug. 9, 2019, 14 pages.

Locatello et al., "Object-centric learning with slot attention," CoRR, arXiv:2006.15055, Oct. 14, 2020, 27 pages.

Lu et al., "VILBERT: Pretraining task-agnostic visiolinguistic representations for vision-and-language tasks," Proceedings of the 33rd International Conference on Neural Information Processing Systems, Dec. 2019, pp. 13-23.

Mahajan et al., "Exploring the limits of weakly supervised pretraining," Computer Vision—ECCV 2018, Lecture Notes in Computer Science, Springer, Oct. 9, 2018, 11206:185-201.

Mahajan et al., "Exploring the limits of weakly supervised pretraining," Proceedings of the European conference on computer vision, Sep. 2018, pp. 181-196.

Nilsback et al., "Automated flower classification over a large No. of classes," 2008 Sixth Indian conference on computer vision, graphics & image processing, Dec. 16, 2008, pp. 722-729.

Parkhi et al., "Cats and dogs," 2012 IEEE conference on computer vision and pattern recognition, Jun. 16, 2012, pp. 3498-3505.

Parmar et al., "Image transformer," International conference on machine learning, Jul. 3, 2018, pp. 4055-4064.

Pham et al., "Meta pseudo labels," Proceedings of the IEEE/CVF conference on computer vision and pattern recognition, Jun. 20-25, 2021, pp. 11557-11568.

Polyak et al., "Acceleration of stochastic approximation by averaging," SIAM journal on control and optimization, Jul. 1992, 30(4):838-855.

(56) References Cited

OTHER PUBLICATIONS

Radford et al., "Improving language understanding with unsupervised learning," Jun. 11, 2018, retrieved on Dec. 14, 2023, retrieved from URL: <https://openai.com/research/language-unsupervised>, 15 pages.

Radford et al., "Language models are unsupervised multitask learners," Technical Report, 2019, 24 pages.

Radford et al., "Learning transferable visual models from natural language supervision," International conference on machine learning, Jul. 1, 2021, pp. 8748-8763.

Raffel et al., "Exploring the limits of transfer learning with a unified text-to-text transformer," CoRR, arXiv:1910.10683, Oct. 2019, 67 pages.

Ramachandran et al., "Stand-alone self-attention in vision models," Proceedings of the 33rd International Conference on Neural Information Processing Systems, Dec. 2019, pp. 68-80.

Recht et al., "Do imagenet classifiers generalize to imagenet?" International conference on machine learning, May 24, 2019, pp. 5389-5400.

Russakovsky et al., "ImageNet large scale visual recognition challenge," International journal of computer vision, Dec. 2015, 115:211-252.

Salimans et al., "Weight Normalization: A simple reparameterization to accelerate training of deep neural networks," Proceedings of the 30th International Conference on Neural Information Processing Systems, Dec. 2016, pp. 901-909.

Sohoni et al., "Low-memory neural network training: A technical report," CoRR, arXiv:1904.10631, Apr. 24, 2019, 38 pages.

Srinivas et al., "Bottleneck transformers for visual recognition," Proceedings of the IEEE/CVF conference on computer vision and pattern recognition, Jun. 20, 2021, pp. 16519-16529.

Sun et al., "Revisiting unreasonable effectiveness of data in deep learning era," Proceedings of the IEEE international conference on computer vision, Oct. 2017, pp. 843-852.

Sun et al., "VideoBERT: A joint model for video and language representation learning," Proceedings of the IEEE/CVF international conference on computer vision, Apr. 2019, pp. 7464-7473.

Tan et al., "EfficientNet: Rethinking model scaling for convolutional neural networks," International conference on machine learning, May 24, 2019, pp. 6105-6114.

Touvron et al., "Fixing the train-test resolution discrepancy: FixEfficientNet," CoRR, arXiv:2003.08237, Nov. 18, 2020, 5 pages.

Touvron et al., "Training data-efficient image transformers & distillation through attention," International conference on machine learning, Jul. 1, 2021, pp. 10347-10357.

Tschannen et al., "Self-supervised learning of video-induced visual invariances," Proceedings of the IEEE/CVF Conference on Computer Vision and Pattern Recognition, Jun. 2020, pp. 13806-13815.

Vaswani et al., "Attention is all you need," Proceedings of the 31st International Conference on Neural Information Processing Systems, Dec. 2017, pp. 6000-6010.

Vaswani et al., "Scaling local self-attention for parameter efficient visual backbones," Proceedings of the IEEE/CVF Conference on Computer Vision and Pattern Recognition, Jun. 2021, pp. 12894-12904.

Wang et al., "Axial-DeepLab: Stand-alone axial-attention for panoptic segmentation," CoRR, arXiv:2003.07853, Aug. 6, 2020, 26 pages.

Wang et al., "Learning deep transformer models for machine translation," 57th Annual Meeting of the Association for Computational Linguistics, Jul. 28-Aug. 2, 2019, pp. 1810-1822.

Wang et al., "Non-local neural networks," Proceedings of the IEEE conference on computer vision and pattern recognition, Jun. 18-22, 2018, pp. 7794-7803.

Wang et al., "Pyramid vision transformer: A versatile backbone for dense prediction without convolutions," Proceedings of the IEEE/CVF international conference on computer vision, Oct. 2021, pp. 568-578.

Weissenborn et al., "Scaling autoregressive video models," CoRR, arXiv:1906.02634, Jun. 6, 2019, 24 pages.

Welinder et al., "Caltech-UCSD Birds 200," Technical Report CNS-TR-2010-001, California Institute of Technology, 2010, 15 pages.

Wu et al., "Group normalization," Proceedings of the European Conference on Computer Vision, Sep. 8-14, 2018, pp. 3-19.

Wu et al., "Visual transformers: Token-based image representation and processing for computer vision," CoRR, arXiv:2006.03677, Jun. 5, 2020, 12 pages.

Xie et al., "Self-training with noisy student improves imagenet classification," CoRR, arXiv:1911.04252, Nov. 2019, 18 pages.

Xie et al., "Self-training with noisy student improves imagenet classification," Proceedings of the IEEE/CVF conference on computer vision and pattern recognition, Jun. 2020, pp. 10687-10698.

Yuan et al., "Tokens-to-token vit: Training vision transformers from scratch on imagenet," Proceedings of the IEEE/CVF international conference on computer vision, Oct. 2021, pp. 558-567.

Zhai et al., "A large-scale study of representation learning with the visual task adaptation benchmark," CoRR, arXiv:1910.04867, Oct. 1, 2019, 33 pages.

Zhai et al., "S4L: Self-supervised semi-supervised learning," Proceedings of the IEEE/CVF international conference on computer vision, Oct. 27-Nov. 2, 2019, pp. 1476-1485.

Zhao et al., "Exploring self-attention for image recognition," Proceedings of the IEEE/CVF conference on computer vision and pattern recognition, Jun. 2020, pp. 10076-10085.

Bjorck et al., "Understanding Decoupled and Early Weight Decay," Paper, Presented at the Conference on Artificial Intelligence, Virtual Event, Feb. 2-9, 2021; Proceedings of the Thirty-Fifth AAAI Conference on Artificial Intelligence, 2021; CoRR, Submitted on Dec. 27, 2020, arXiv:2012.13841v1, 19 pages.

Dosovitskiy et al., "An Image is Worth 16×16 Words: Transformers for Image Recognition at Scale," CoRR, Submitted on Oct. 22, 2020, arXiv:2010.11929v1, pp. 1-21.

Duanmu et al., "Fast Mode and Partition Decision Using Machine Learning for Intra-Frame Coding in HEVC Screen Content Coding Extension," IEEE Journal on Emerging and Selected Topics in Circuits and Systems, Dec. 2016, 6(4):517-531.

Ishii et al., "Layer-Wise Weight Decay for Deep Neural Networks," Paper, Presented at the Pacific-Rim Symposium on Image and Video Technology, Wuhan, China, Nov. 20-24, 2017; LNIP, 2018, 10749:276-289.

Jillani et al., "Low Complexity Intra MB Encoding in AVC/H.264," IEEE Transactions on Consumer Electronics, Feb. 2009, 55(1):277-285.

Loshchilov et al., "Decoupled Weight Decay Regularization," CoRR, Submitted on Jan. 4, 2019, arXiv:1711.05101v3, pp. 1-11, 19 pages.

Office Action in Chinese Appln. No. 202210600264.5, mailed on Dec. 30, 2024, 25 pages (with English translation).

Pfaff et al., "Neural network based intra prediction for video coding," Proceedings of the Applications of Digital Image Processing XLI, Sep. 2018, 10752:7 pages.

Wu, "Research on Target Recognition of SAR Image based on Deep Learning," Chinese Master's Theses Full-Text Database, Science and Technology Series, Jun. 15, 2019, 144 pages (with English translation).

* cited by examiner

300

Obtain first training data　　　302

Train ViT on first training data using different weight decay values　　　304

After training the ViT on the first training data, train self-attention neural network blocks on downstream task　　　306

400

402

Perform initial phase

404

Perform main phase

406

Perform final phase

TRAINING LARGE-SCALE VISION TRANSFORMER NEURAL NETWORKS

CROSS-REFERENCE TO RELATED APPLICATION

This application claims priority to U.S. Provisional Application No. 63/194,900, filed on May 28, 2021. The disclosure of the prior application is considered part of and is incorporated by reference in the disclosure of this application.

BACKGROUND

This specification relates to processing images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains a Vision Transformer neural network (ViT). A ViT is a neural network that processes an input that includes an image, i.e., that processes the intensity values of the pixels of the image, to generate an output for the image, e.g., a classification or a regression output, and that includes one or more self-attention layers and one or more output layers.

The subject matter described in this specification can be implemented in particular embodiments so as to realize one or more of the following advantages.

This specification describes modifications to the architecture, the training, or both of a ViT. The described modifications ((i) decoupling weight decay values, (ii) generating the classification output from all of the output elements instead of including, in the input sequence, an extra position from which the classification output is generated but which doesn't correspond to any of the patches in the image, and (iii) storing momentum values with reduced precision during training) allow the system to pre-train a ViT neural network that then achieves state-of-the-art performance on any of a variety of downstream tasks. In particular, when at least modification (i) and (ii) are adopted, the ViT can achieve significantly improved results on downstream classification tasks, e.g., by using a larger ViT, and without causing an excessively large increase in computation resource consumption. When all three are adopted, the ViT achieves significantly improved results while further reducing the increase in computational resource consumption, e.g., decreasing the increase in memory use as a result of the increase in the model size.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that trains a Vision Transformer neural network (ViT).

Figure 1:
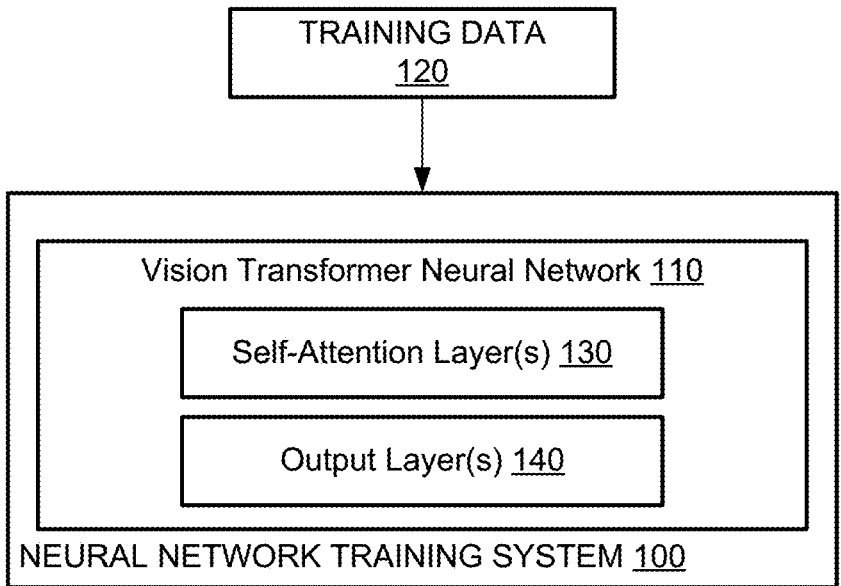
FIG. 1 is a diagram of an example neural network training system.

FIG. 1 is a diagram of an example neural network training system 100. The neural network training system 100 is an example of a system implemented as computer programs on one or more computers in one or more locations, in which the systems, components, and techniques described below can be implemented.

The neural network training system 100 is configured to train a Vision Transformer neural network 110.

A Vision Transformer neural network (ViT) 110 is a neural network that obtains a plurality of image patches of an image and processes the image patches to generate an output for the input image and that includes one or more self-attention layers 130 and one or more output layers 140. Each image patch includes a different subset of the pixels of the image.

The ViT 110 processes the plurality of image patches to generate an input sequence that includes a respective input element ("patch embedding") at each of a plurality of positions, where the input sequence includes a respective input element corresponding to each of the plurality of image patches.

The ViT 110 processes the input sequence through a plurality of self-attention neural network blocks to generate an output sequence comprising a respective output element at each of the positions and processes one or more of the output elements using the one or more output layers 140 to generate a classification output for the image.

Generally, each block updates the elements in the input sequence, i.e., the input sequence to each block is the input after having been updated by a previous block (or, for the first block, the original input sequence of elements). The blocks are referred to as "self-attention" neural network blocks because each of the blocks includes one or more self-attention layers 130 that each applies a self-attention mechanism over the elements in the input sequence (as received by the block) as part of updating the input sequence.

A classification output generally includes a respective score corresponding to each of multiple categories. The score for a category indicates a likelihood that the image belongs to the category. In some cases, the categories may be classes of objects (e.g., dog, cat, person, and the like), and the image may belong to a category if it depicts an object included in the object class corresponding to the category. In some cases, the categories may represent global image properties (e.g., whether the image depicts a scene in the day or at night, or whether the image depicts a scene in the summer or the winter), and the image may belong to the category if it has the global property corresponding to the category.

Example configurations of ViTs are described in more detail below with reference to FIG. 2.

To train the ViT 110, the system 100 obtains first training data 120.

The first training data 120 includes a plurality of training images and a respective target classification output for each training image.

The system 100 then trains the vision Transformer neural network 110 on the first training data 120, e.g., through supervised learning to minimize an appropriate classification loss, e.g., a loss function that includes a cross-entropy loss between the target classification output for a given training image and the classification output generated by the ViT 110 for the given training image and, optionally, one or more regularization terms.

After this training, the system 100 can use the trained ViT 110 to perform the classification task on new input images or provide data specifying the trained ViT 100 for use in performing the classification task.

Alternatively or in addition, the system 100 can train the self-attention blocks jointly with another set of output layers on a different, downstream task, e.g., on a different classification task or on a regression task, i.e., on training data for the downstream task.

As a particular example, the downstream neural network that includes the self-attention blocks and the other set of output layers can be configured to generate a classification output that includes a respective score corresponding to each of multiple categories, where the multiple categories are different from those used in the initial training.

As another particular example, the downstream neural network can be configured to generate a pixel-level classification output that includes, for each pixel in the image, a respective score corresponding to each of multiple categories. For a given pixel, the score for a category indicates a likelihood that pixel belongs to the category. In some cases, the categories may be classes of objects, and a pixel may belong to a category if it is part on an object included in the object class corresponding to the category. That is, the pixel-level classification output may be semantic segmentation output.

As another particular example, the downstream neural network can be configured to generate a regression output that estimates one or more continuous variables (i.e., that can assume infinitely many possible numerical values) that characterize the image. In a particular example, the regression output may estimate the coordinates of bounding boxes that enclose respective objects depicted in the image. The coordinates of a bounding box may be defined by (x, y) coordinates of the vertices of the bounding box.

In some implementations, the downstream neural network can be configured to perform a video analysis task. For example, the system can receive multiple images that are video frames of a video, and can process each video frame as described above to generate an output that characterizes the video frames, e.g., by characterizing whether the video frames depict a person performing a particular action.

In some cases, the parameters of the self-attention blocks are fine-tuned during the training on the training data for the downstream task. In other cases, the parameters of the self-attention blocks are held fixed and only the parameters of the different set of output layers for the downstream tasks are updated.

After this training, the system 100 can use the trained downstream neural network to perform the downstream task on new input images or provide data specifying the trained downstream neural network for use in performing the classification task.

The ViT 110 is generally "scaled up" relative to conventional ViTs, i.e., has significantly more parameters than conventional ViTs. For example, the ViT 110 can have on billion or more parameters, approximately two billion parameters, or more than two billion parameters.

To "scale up" a conventional ViT, increases can be made to one or more of: the number of self-attention blocks (i.e., to the depth of the neural network), the dimensionality of the patch embeddings and vectors operated on by the self-attention mechanisms (width of the neural network), the number of attention heads in the self-attention mechanism, and the hidden dimension of MLP blocks within each of the self-attention blocks (MLP-width). All of the above increases generally increase the total number of parameters with the self-attention blocks of the ViT.

Table 1 shows examples of various scaled up configurations of the ViT:

TABLE 1

| Name | Width | Depth | MLP | Heads | Mio, Param | GFLOPs 224² | 384² |
|------|-------|-------|-----|-------|------------|-------------|------|
| s/28 | 256 | 6 | 1024 | 8 | 5.4 | 0.7 | 2.0 |
| s/16 | 256 | 6 | 1024 | 8 | 5.0 | 2.2 | 7.8 |
| S/32 | 384 | 12 | 1536 | 6 | 22 | 2.3 | 6.9 |
| Ti/16 | 192 | 12 | 768 | 3 | 5.5 | 2.5 | 9.5 |
| B/32 | 768 | 12 | 3072 | 12 | 87 | 8.7 | 26.0 |
| S/16 | 384 | 12 | 1536 | 6 | 22 | 9.2 | 31.2 |
| B/28 | 768 | 12 | 3072 | 12 | 87 | 11.3 | 30.5 |
| B/16 | 768 | 12 | 3072 | 12 | 86 | 35.1 | 111.3 |
| L/16 | 1024 | 24 | 4096 | 16 | 303 | 122.9 | 382.8 |
| g/14 | 1408 | 40 | 6144 | 16 | 1011 | 533.1 | 1596.4 |
| G/14 | 1664 | 48 | 8192 | 16 | 1843 | 965.3 | 2859.9 | where "Mio Param" is the number of parameters in millions and GFLOPs are the giga floating point operations per second required by each of the architectures when processing 224×224 pixel images and 384×384 images for each of the configurations.

To allow the system 100 to train the ViT 110 effectively despite this large size, the system 100 makes one or more modifications to the training process while training the ViT 110 on the first training data 120.

Examples of such modifications are described above with reference to FIGS. 3A and 4.

By modifying the training of the ViT 110 as described below, the system 100 can improve the performance of the downstream neural network on the downstream task. That is, because the self-attention blocks are trained as part of the ViT 110, the modifications to the training of the ViT 110 cause the blocks to generalize better to the downstream task, even when training data for the downstream task is limited. In particular, the modifications to the training of the ViT 110 allow the self-attention blocks to better leverage the increased scale of the ViT, i.e., the larger number of parameters of the ViT 110 relative to conventional ViTs, to improve transfer to the downstream task.

Figure 2:
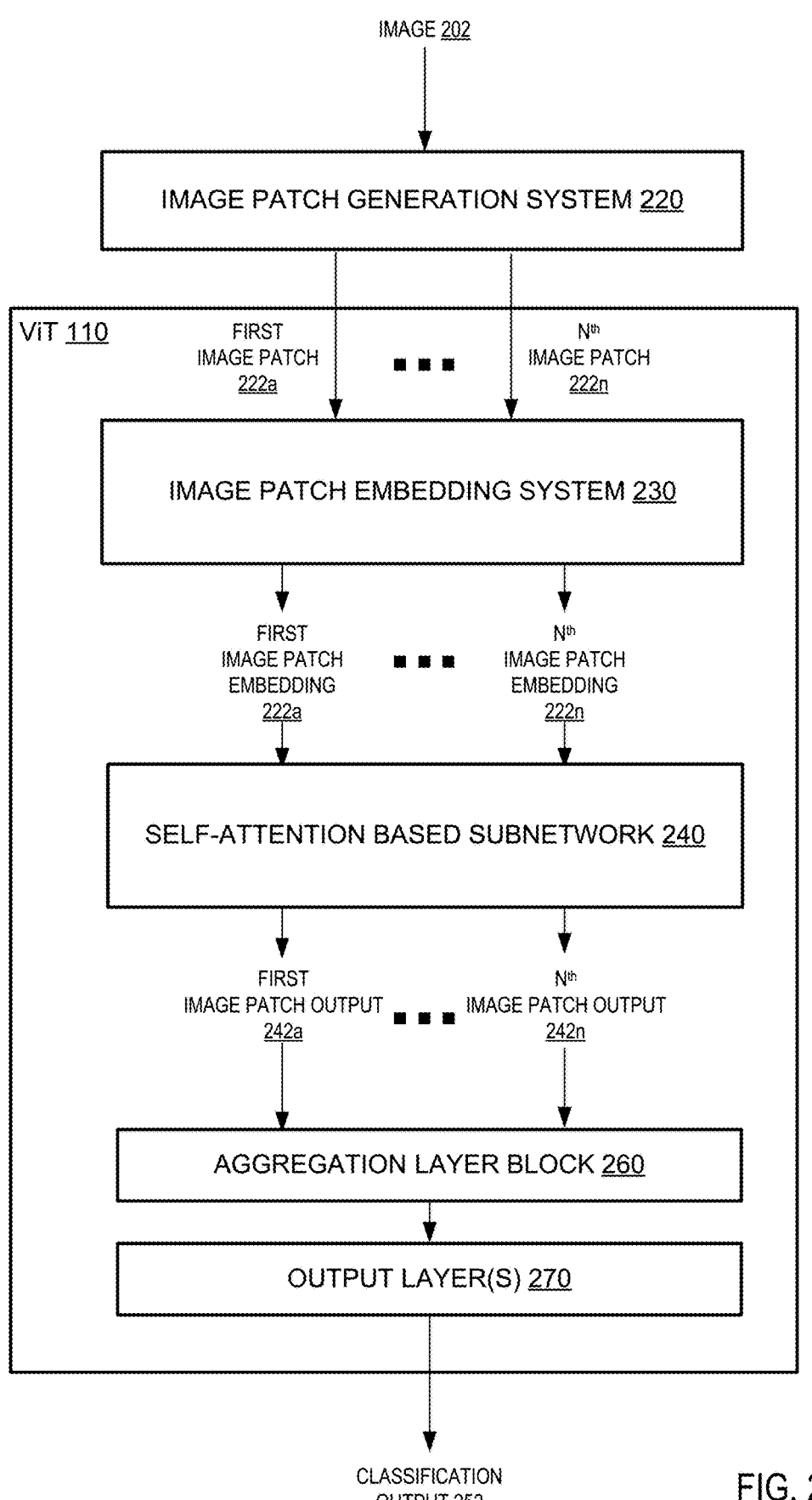
FIG. 2 shows the processing of an input by the ViT.

FIG. 2 shows the processing of an input image 202 using the ViT 110 to generate a classification output 152.

The image can be any appropriate type of image. For example, the image can be a two-dimensional image, e.g., a two-dimensional image that has multiple channels (e.g., an RGB image). As another example, the image 202 can be a hyperspectral image that represents a continuous spectrum of wavelengths, e.g., by identifying, for each pixel in the image 202, a distribution over the spectrum. As another example, the image 202 can be a point cloud that includes multiple points, where each point has a respective coordinate, e.g., in a three-dimensional or a higher-dimensional coordinate space; as a particular example, the image 202 can be a point cloud generated by a LIDAR sensor. As another example, the image 202 can be a medical image generating by a medical imaging device; as particular examples, the image 202 can be a computer tomography (CT) image, a magnetic resonance imaging (MRI) image, an ultrasound image, an X-ray image, a mammogram image, a fluoroscopy image, or a positron-emission tomography (PET) image.

Although the below description refers to generating image patches of the image 202 that each include respective "pixels" of the image 202, it is to be understood that the neural network training system 100 can generate image patches that include components of the image 202 that are of any appropriate type. For example, if the image 202 is a point cloud, then each image patch of the image 202 can include a subset of the points in the point cloud. As another example, if the image 202 is an MRI image that includes multiple voxels in a three-dimensional voxel grid, then each image patch of the image 202 can include a subset of the voxels in the voxel grid.

In the example depicted in FIG. 2, the ViT 110 is configured to process, using the self-attention based subnetwork 240, an input sequence that includes input elements representing respective patches of the image 202. Thus, the ViT 110 can apply an attention mechanism to the input sequence in order to attend to different patches at different locations in the image 202. It will be understood that the patches of the image 202 may be processed by a self-attention based subnetwork 240 that includes the self-attention blocks using parallel processing, i.e., at least part of the processing may be performed in parallel.

An image patch generation system 220 is configured to process the image 202 and to generate n different patches 212*a-n* of the image 202. In this specification, an image patch of an image is a strict subset of the pixels of the image. Generally, each image patch 212*a-n* includes multiple contiguous pixels of the image 202. That is, for each particular image patch 212*a-n* and for any pair of pixels in the particular image patch 212*a-n*, there exists a path from the first pixel of the pair to the second pixel of the pair where the path only includes pixels in the particular image patch 212*a-n*.

In some implementations, each pixel in the image 202 is included in exactly one of the image patches 212*a-n*. For example, the system 100 can partition the image 102 into equal sized patches to generate the image patches 212*a-n*.

The image patches 212*a-n* can be represented in any appropriate way. For example, each image patch 212*a-n* can be represented as a two-dimensional image that includes the pixels of the image patch 212*a-n*, e.g., an image that maintains the spatial relationships of the pixels in the image patch 212*a-n*.

As another example, each image patch 212*a-n* can be represented as a one-dimensional sequence of the pixels of the image patch 212*a-n*. As a particular example, if the image patch 212*a-n* is a two-dimensional region of the image 202, then the image patch 212*a-n* can be a flattened version of the two-dimensional region, as is described in more detail below. As another particular example, if the image patch 212*a-n* includes only pixels that share the same column or row of the image 202 (i.e., if the image patch 212*a-n* is a one-dimensional region of the image 202), then the image patch 212*a-n* can be represented as a one-dimensional sequence that maintains the relative positions of the pixels.

As another example, each image patch 212*a-n* can be represented as an unordered set of the pixels of the image patch 212*a-n*.

An image patch embedding system 230 is configured to obtain the n image patches 212*a-n* of the image 202, and to generate a respective embedding 222*a-n* of each of the n image patches 212*a-n*. These embeddings are also referred to as image patch embeddings. Each image patch embedding 222*a-n* represents the pixels of the corresponding image patch 212*a-n* and can be generated by processing the pixels of the corresponding image patch 212*a-n*. In this specification, an embedding is an ordered collection of numeric values that represents an input in a particular embedding space. For example, an embedding can be a vector of floating point or other numeric values that has a fixed dimensionality.

In some implementations in which each image patch 212*a-n* is represented as a two-dimensional sub-image of the image 202, each image patch embedding 222*a-n* is a reshaped version of the corresponding image patch 212*a-n*. For example, the image patch embedding system 230 can "flatten" each image patch 212*a-n* to generate an image patch embedding 222*a-n* that is a one-dimensional tensor that includes each pixel in the image patch 212*a-n*. As a particular example, if each image patch 212*a-n* has dimensionality L×W×C, where C represents the number of channels of the image (e.g., C=3 for an RGB image), then the image patch embedding 222*a-n* can generate an image patch embedding 222*a-n* that has dimensionality 1×(L·W·C).

In some other implementations, the image patch embedding system 230 can process a one-dimensional tensor that includes the pixels of the image patch 212*a-n* (e.g., a flattened version of the image patch 212*a-n*) to generate the corresponding image patch embedding 222*a-n*. As described in more detail below, the image patch embeddings 222*a-n* are to be processed by the ViT 110, which has been configured through training to accept inputs having a particular format, e.g., a particular size and shape. Thus, the image patch embedding system 230 can project each image patch 212*a-n* into a coordinate space that has the dimensionality required by the ViT 110.

For example, the image patch embedding system 230 can process each image patches 212*a-n* using a linear projection:

$$z_i = x_i E_i + b_i$$

where $z_i \in \mathbb{R}^D$ is the $i^{th}$ image patch embedding 222*a-n*, D is the input dimensionality required by the ViT 110, $x_i \in \mathbb{R}^N$ is the one-dimensional tensor including the $i^{th}$ image patch 212*a-n*, N is the number of pixels in the $i^{th}$ image patch 212*a-n*, $E_i \in R^{N \times D}$ is a projection matrix, and $b_i \in \mathbb{R}^D$ is a linear bias term.

In some implementations, the image patch embedding system 230 uses a respective different projection matrix $E_i$ to generate each image patch embedding 222*a-n*; in some other implementations, the image patch embedding system 230 uses the same projection matrix E to generate each image patch embedding 222*a-n*. Similarly, in some implementations, the image patch embedding system 230 uses a respective different bias term $b_i$ to generate each image patch embedding 222*a-n*; in some other implementations, the image patch embedding system 230 uses the same bias term $b_i$ to generate each image patch embedding 222*a-n*.

In some implementations, the linear projection is machine-learned. For example, during training of the ViT 110, the training system 100 can concurrently update the parameters of the linear projection (e.g., the parameters of the projection matrices $E_i$ and bias terms $b_i$). As a particular example, the training system can update the parameters of the linear projection by backpropagating a training error of the ViT 110 through the ViT 110 and to the image patch embedding system 230, and determining the update using stochastic gradient descent on the backpropagated error during the training on the first training data 120. Instead of or in addition to processing the one-dimensional tensors corresponding to the image patches 212a-n with a linear projection, the image patch embedding system 230 can process the one-dimensional tensors using an embedding neural network. For instance, the embedding system 230 can be considered a component of the ViT 110. That is, the embedding system 230 can be an embedding subnetwork of the ViT 110 that includes one or more neural networks layers that are configured to process the one-dimensional tensors and to generate the image patch embeddings 222a-n.

For example, the embedding neural network can include one or more feedforward neural network layers that are configured to process a one-dimensional tensor corresponding to the image patch 212a-n.

As another example, the embedding neural network can include one or more self-attention neural network layers that are configured to process each one-dimensional tensor corresponding to a respective image patch 212a-n concurrently using a self-attention mechanism.

As another example, the embedding neural network can include one or more convolutional neural network layers that are configured to process an image patch 212a-n using a convolutional filter. As a particular example, if the image patches 212a-n are represented as two-dimensional images, the image patch embedding system 230 can process each (unflattened) image patch 212a-n using one or more convolutional neural network layers to generate a feature map of the image patch 212a-n. The image patch embedding system 230 can then flatten the feature map and process the flattened feature map using a linear projection, as described above, to generate the corresponding image patch embedding 222a-n.

As another particular example, the image patch embedding system 230 can process the entire image 202 using one or more convolutional neural network layers to generate a feature map of the image 202. The feature map can be two-dimensional (or, like the image 202, can be two-dimensional where each element has multiple channels). The neural network training system 100 can then determine n patches of the feature map of the image 202, where each patch includes one or more elements of the feature map. That is, instead of segmenting the image 202 itself into the image patches 212a-n, the image patch generation system 110 can segment the feature map of the image 202 generated by the embedding neural network of the image patch embedding system 230. As a particular example, each patch can include a single element of the feature map. The image patch embedding system 230 can then generate the image patch embeddings 222a-n from the n patches of the feature map, e.g., by applying a linear projection to the patches of the feature map as described above.

After the image patch embedding system 230 generates the image patch embeddings 222a-n, the neural network training system 100 can generate the input sequence to be provided as input to the ViT 110 from the image patch embeddings 222a-n. Generally, the input sequence includes one or more input elements corresponding to respective image patch embeddings 222a-n. For example, the input sequence can include a respective input element corresponding to each of the n image patch embeddings 222a-n. As a particular example, the input elements corresponding to the n image patch embeddings 222a-n can be sorted in the input sequence in the raster order of the corresponding image patches 212a-n.

In some implementations, the input element in the input sequence corresponding to an image patch embedding 222a-n is equal to the image patch embedding 222a-n itself.

In some other implementations, to generate the input element of the input sequence corresponding to an image patch embedding 222a-n, the neural network training system 100 can combine (i) the image patch embedding 222a-n and (ii) a positional embedding that represents the position within the image 202 of the image patch 212a-n corresponding to the image patch embedding 222a-n. For example, the neural network training system 100 can append the positional embedding to the image patch embedding 222a-n. By incorporating the positional embeddings, the neural network training system 100 can encode spatial information, e.g., the relative positioning of each image patch in the image, that can be leveraged by the ViT 110 to generate the classification output 252.

In some implementations, the positional embedding corresponding to each image patch 212a-n of the image 202 is an integer. For example, a first image patch at the top left of the image 202 can have a positional embedding of '1', a second image patch immediately to the right of the first image patch can have a positional embedding of '2', and so on.

In some other implementations, the positional embeddings are machine-learned. For example, during the training of the ViT 110, a training system can concurrently learn the positional embeddings by backpropagating a training error of the ViT 110 through the ViT 110 and to the positional embeddings. In some such implementations, the training system can generate a respective different positional embedding for each image patch (e.g., assuming every image 202 received by the neural network training system 100 is segmented into the same number of patches).

In some other implementations, the training system can incorporate two-dimensional information into the positional embeddings by learning, for both dimensions of the image 202, a respective positional embedding for each coordinate along the dimension. For example, if the image 202 is segmented into a two-dimensional grid of image patches 212a-n, the training system can generate two sets of positional embeddings: a first set that includes a respective positional embedding for each index along the vertical axis of the grid and a second set that includes a respective embedding for each index along a horizontal axis of the grid. To generate the positional embedding for a particular image patch 212a-n, the neural network training system can combine, e.g., by concatenating, (i) the positional embedding corresponding to the index of the particular image patch 212a-n along the vertical axis, and (ii) the positional embedding corresponding to the index of the particular image patch 212a-n along the horizontal axis.

In some implementations, one or more of the input elements in the input sequence do not correspond to any image patch 212a-n of the image 202. For example, the input sequence can include a class embedding that is the same for all received images 102. For example, the class embedding can be a tensor having the same dimensionality as the image patch embeddings 222a-n. As a particular example, the class embedding can be a tensor of all '0's or all '1's.

The class embedding can be inserted at any position in the input sequence; e.g., the class embedding can be the first input element of the input sequence, or the last input element of the input sequence.

In some implementations, the class embedding is machine-learned. For example, during the training of the ViT 110, a training system can concurrently learn parameters for the class embedding by backpropagating a training error of the ViT 110 through the ViT 110 and to the class embedding.

In implementations in which the input element corresponding to each image patch 212a-n includes a positional embedding corresponding to the image patch 212a-n, the neural network training system 100 can append a positional embedding to the class embedding as well, e.g., a machine-learned positional embedding or a predetermined positional embedding (e.g., a positional embedding of all '0's or all '1's).

However, adding the class embedding to the input sequence requires the ViT 110 to process a longer input sequence. Given the configuration of modern hardware and the large number of parameters of the ViT 110, this can increase the memory overhead of the ViT, e.g., due to token padding required by modern machine learning accelerators.

In some implementations, to remove this memory overhead, the sequence does not include a class embedding, i.e., each element in the input sequence corresponds to a different patch of the image 202 and the sequence does not include any elements that do not correspond to patches.

After generating the input sequence, the neural network training system 100 can provide the input sequence as input to the ViT 110. The ViT 110 can process the input sequence to generate the classification output 252.

In particular, the ViT 110 can process the input sequence using the self-attention based subnetwork 240 to generate an output sequence. In some implementations, the ViT 110 generates an output sequence of the same length as the input sequence, i.e., that includes a respective output element for each input element in the input sequence, by repeatedly updating the elements in the input sequence.

The self-attention based subnetwork 240 can include one or more self-attention neural network layers that each receive a layer input sequence and apply a self-attention mechanism to the layer input sequence to generate a layer output sequence. In some such implementations, the self-attention based subnetwork 240 includes a sequence of multiple network blocks that are each configured to receive a respective block input sequence that includes a respective element corresponding to each input element in the input sequence, and process the block input sequence to generate a respective block output sequence that includes a respective element for each input element in the input sequence. Each network block can include one or more self-attention neural network layers.

After the self-attention based subnetwork 240 generates the output sequence, the ViT 110 can provide one or more elements of the output sequence to a head subnetwork that includes one or more output layers.

When each input element in the input sequence corresponds to a respective one of the image patches, i.e., no class embedding is included, the head subnetwork can include an aggregation layer block 260 that is configured to aggregate all of the output elements to generate an aggregated output element and one or more output layers 270 that are configured to generate the classification output from the aggregated output element.

As a particular example, the aggregation layer block 260 can combine the output elements 242a-n using global average pooling (GAP). That is, the block 260 applies global average pooling (GAP) to the output elements to generate the aggregated output element.

As another particular example, the aggregation layer block 260 can combine the output elements 242a-n using multihead attention pooling (MAP). That is, the block 260 applies multihead attention pooling (MAP) to the output elements to generate the aggregated output element. To apply MAP, the system applies a multi-head attention mechanism that uses, as a query, a learned query vector, and keys and values derived from the output elements to generate as output a single vector that can be used as the aggregated output element.

As a particular example, the final output layers 270 can be a single linear layer that is configured to map the aggregated output element to the classification output, i.e., without the non-linear projection before the final prediction layer that is included in conventional ViTs. Removing this layer can further increase the computational efficiency of performing forward and backward passes through the ViT and, therefore, of the training process.

As another example, when the input sequence includes the class embedding, the head subnetwork can be configured to process only the class output to generate the classification output 252. That is, the class output can represent a final representation of the image 202, and the head subnetwork can process the class output to generate the classification output 252. For example, the head subnetwork can include one or more feedforward neural network layers.

Figure 3A:
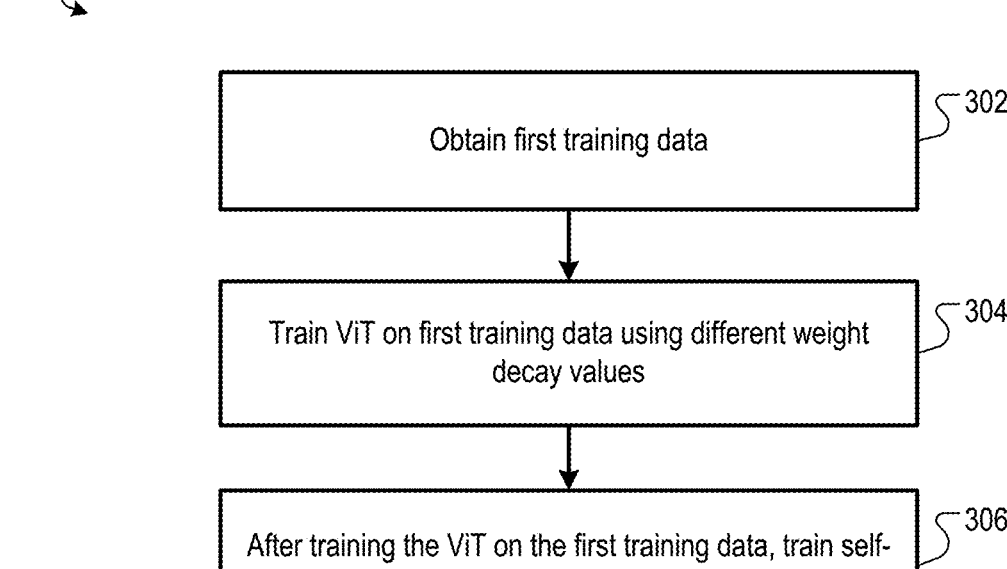
FIG. 3A is a flow diagram of an example process for training the ViT.

FIG. 3A is a flow diagram of an example process 300 for training a ViT on a classification task. For convenience, the process 300 will be described as being performed by a system of one or more computers located in one or more locations. For example, a neural network training system, e.g., the neural network training system 100 depicted in FIG. 1, appropriately programmed in accordance with this specification, can perform the process 300.

The system obtains first training data for a classification task (step 302). The first training data includes a plurality of training images and a respective target classification output for each training image. For example, the first training data can include a very large number of images of varying quality with potentially noisy labels. One example of such a data set is the JFT-300M data set described in Chen Sun, Abhinav Shrivastava, Saurabh Singh, and Abhinav Gupta. Revisiting Unreasonable Effectiveness of Data in Deep Learning Era. ICCV, October 2017. In some cases, this first training data can include even more than the 300 million images in the JFT-300M data set, e.g., 1 billion or more images.

The system trains the ViT on the first training data on an objective function for the classification task using different weight decay values for different components of the ViT (step 304).

During the training, the system assigns a first weight decay value to the parameters of the one or more output layers, assigns a second weight decay value to the parameters of the plurality of self-attention neural network blocks, and updates the parameters of the one or more output layers and the plurality of self-attention neural networks using the first and second weight decay values, respectively.

Generally, the first weight decay value is higher than the second weight decay value. That is, the system decouples the weight decay value for the output layers from the weight decay value for the self-attention blocks.

For example, the first weight decay value can be greater than or equal to 0.3 while the second weight decay value is less than 0.3.

As another example, the first weight decay value can greater than or equal to 1.0 while the second weight decay value is less than 0.3.

As another example, the first weight decay value can greater than or equal to 3.0 while the second weight decay value is less than 0.3.

As another example, the first weight decay value can be greater than or equal to 10.0 while the second weight decay value is less than 0.3.

In some examples, the second weight decay value can be set even lower, e.g., to less than or equal to 0.1 and, in some cases, is less than or equal to 0.01.

As a particular example, the first weight decay value can be equal to 3.0 while the second weight decay value is equal to 0.03. In some cases, however, the difference between the weight decay values can be even greater, e.g., when the first weight decay value is greater than or equal to 10.0 while the second weight decay value is as low as less than or equal to 0.01.

The system can use the first and second weight decay values in any of several ways during the training.

As a particular example, the objective function can include a first regularization term, e.g., an L2 regularization term, for the parameters of the one or more output layers, e.g., of the final linear layer or, more generally, the one or more final layers that follow the aggregation operation block, that has a weight that is defined by the first weight decay value, e.g., equal to the decay value, equal to a fraction of the decay value, or equal to the decay value divided by a current learning-rate for the training, and a second regularization term, e.g., an L2 regularization term, for the parameters of the self-attention blocks that has a weight that is defined by the second weight decay value, e.g., equal to the decay value, equal to a fraction of the decay value, or equal to the decay value divided by a current learning-rate for the training.

Thus, gradients of, and, therefore, updates to, the parameters of the one or more output layers will depend on the first weight decay value while gradients of, and, therefore, updates to, the parameters of the self-attention blocks will depend on the second weight decay value.

As another particular example, at each training step, the system can compute a gradient-based update to the parameters using an optimizer, i.e., based on a gradient of an objective function computed at the training step, and then, for each parameter, compute an update that is a combination of, e.g., sum of, (i) the gradient-based update for the parameter and (ii) a weight decay update for the parameter that is generated by multiplying the current value of the parameter with the weight decay value that corresponds to the parameter, i.e., the first decay value if the parameter is one of the parameters of the output layer(s) or the second weight decay value if the parameter is one of the parameters of the self-attention blocks. The system can then apply the update to the current value of the parameter, e.g., by multiplying the update by a schedule multiplier value and then subtracting the result from the current value or by directly subtracting the update from the current value.

As another particular example, the system can use the weight decay values in both the ways described above, i.e., both as part of the objective function and as part of directly computing the updates.

By decoupling the weight decay as described above, the system can achieve significantly improved performed for the downstream task described above and also below with reference to step 306. In particular, while high weight decay in the "head" (output layer(s)) can actually decrease performance on the pre-training (classification) task, it improves transfer performance, i.e., improves the performance of the final fine-tuned downstream neural network on the downstream task. One reason for this may be that a stronger weight decay in the head results in representations with larger margin between classes, and thus better few-shot adaptation. That is, by decoupling the weight decay, the system can effectively leverage the representation capacity of the self-attention layer blocks (the "body") to improve performance on the downstream task. In some cases, the system decouples the weight decay as described only for training on the first training data, and then does not decouple weight decay during downstream training.

Figure 3B:
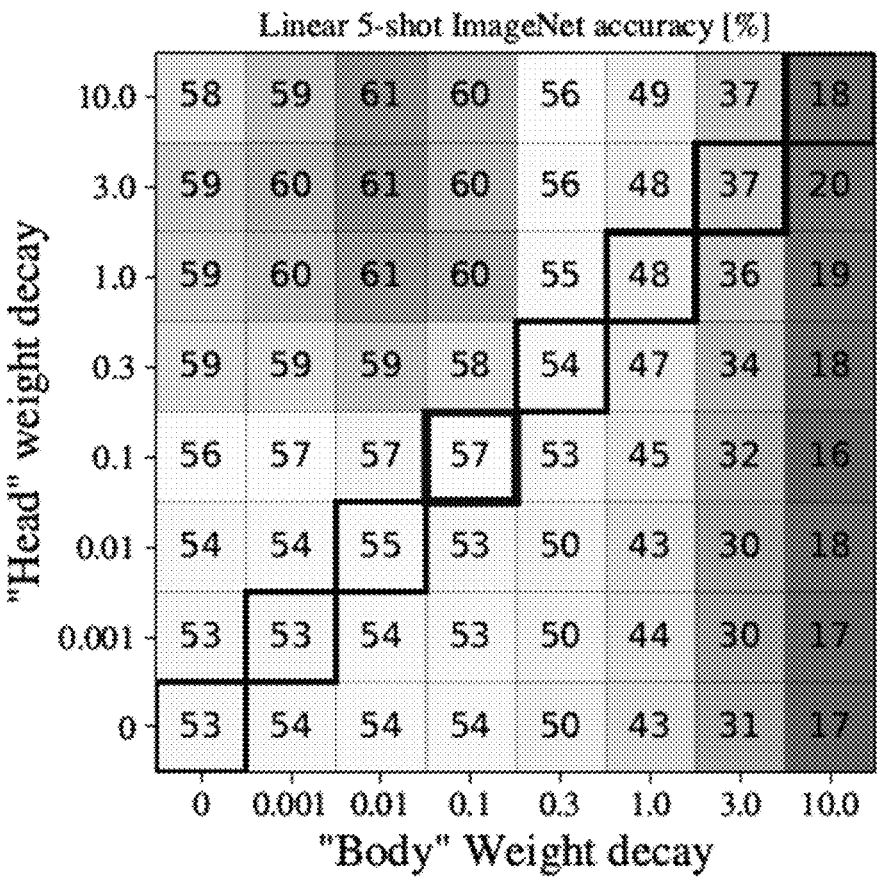
FIG. 3B shows example combinations of weight decay for the "body" and the "head" and the resulting performances on a downstream task that requires few-shot transfer.

FIG. 3B shows example combinations of weight decay for the "body" and the "head" and the resulting performances (accuracies) on a downstream task that requires few-shot transfer (a linear 5-shot ImageNet task).

As can be seen from FIG. 3B, the ViT achieves higher accuracy on the downstream task when the head weight decay is significantly higher than the body weight decay. This is despite the fact that the ViT generally achieves better performance on the classification task ("upstream" task) with the weight decays being approximately equal between the head and the body.

Generally, during the training, the system repeatedly performs training steps by, at each training step, computing, using one or more of the training examples, gradients of an objective function for the training and applying an optimizer to the gradients to generate a gradient-based update to the parameters.

Generally, the optimizer makes use of a respective momentum value for each of the parameters in order to map the gradient for the parameter to an update for the parameter. One example of such an optimizer is Adam. Another example of such an optimizer is Adafactor, modified to track the momentum in addition to the second momentum as in the default configuration.

Thus, given the size of the ViT, storing the momentum values for each parameter during the training can consume significant memory and become a bottleneck for the training.

In some implementations, to account for this, the system stores the respective momentum values with a reduced precision relative to the parameters. As a particular example, the system can store the respective momentum values with half-precision relative to the parameters. For example, if parameters are stored using a 32 bit number format, the system can store the momentum values in a 16 bit number format.

This provides a significant reduction in memory consumption during the training of the ViT. Advantageously, it was found that training ViTs with half-precision momentum does not affect training dynamics and has no effect on the outcome, i.e., on the performance of the trained model, even though it results in every update being computed using a value that is stored with reduced precision and reduced precision values are generally less reliable and introduce error. Therefore, the system can make the training memory efficient without degrading performance.

In some implementations, the system further increases the performance of the scaled-up ViT on the downstream task by dividing the training into different phases and performing the training differently during each phase. This is described in more detail below with reference to FIG. 4.

After this training, the system can train the self-attention blocks as part of a downstream neural network, i.e., jointly with another set of output layers on a different, downstream task, e.g., on a different classification task or on a regression task (step 306). The downstream task generally has much less training data than is available in the first training data. However, because of the modifications described above, the scaled up ViT is able to leverage the additional parameters to achieve performance that significantly exceeds smaller ViTs on the downstream task. In some cases, the system does not decouple weight decay during downstream training. That is, the system sets the weight decay value for the self-attention blocks equal to the weight decay value for the other set of output layers during training for the downstream task.

Figure 4:
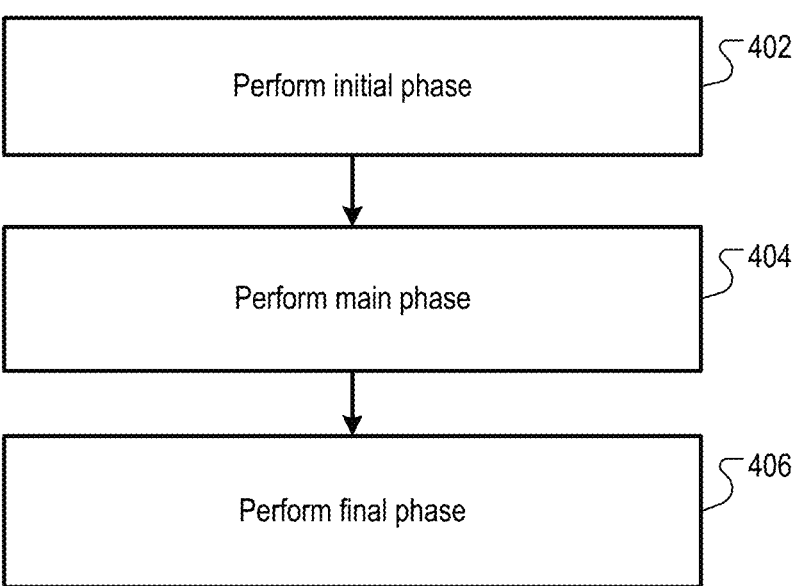
FIG. 4 is a flow diagram of an example process for performing various phases during the training of the ViT.

FIG. 4 is a flow diagram of an example process 400 for performing various phases during the training of the ViT on the classification task. For convenience, the process 400 will be described as being performed by a system of one or more computers located in one or more locations. For example, a neural network training system, e.g., the neural network training system 100 depicted in FIG. 1, appropriately programmed in accordance with this specification, can perform the process 400.

In the example of FIG. 4, the system has divided the training into an initial ("warmup") phase, a main phase, and a final ("cooldown") phase.

For example, the initial phase can include the first k training steps during the training on the first training data, the main phase can include the subsequent m training steps during the training on the first training data, and the final phase can include the last n training steps during the training on the first training data. The values for k, m, and n can either be specified in advance, e.g., based on the number of first training examples in the first training data, or can be determined dynamically during training, e.g., based on the change in accuracy of the ViT during the training.

Thus, the system performs the initial phase of the training (step 402), i.e., by performing k training steps. During the initial phase of the training, the system linearly anneals the learning-rate for the parameters of the output layers and the self-attention blocks away from zero.

The system performs the main phase of the training between the initial phase and the final phase (step 404). During the main phase, the system applies a schedule that prevents the learning-rate from reaching zero. This can be achieved by using either a constant, or a reciprocal square-root schedule for the main phase of training.

The system performs the final phase of the training after performing the main phase (step 406). During the final phase of the training, the system linearly anneals the learning-rate toward zero.

Setting the learning-rate in this fashion prevents the system from needing to specify the training duration in advance, which can be difficult for scaled up models with large numbers of parameters.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a vision Transformer neural network, the vision Transformer neural network configured to:

obtain a plurality of image patches of an image, wherein each image patch comprises a different subset of the pixels of the image;

process the plurality of image patches to generate an input sequence comprising a respective input element at each of a plurality of positions, wherein the input sequence includes a respective input element corresponding to each of the plurality of image patches;

process the input sequence through a plurality of self-attention neural network blocks to generate an output sequence comprising a respective output element at each of the positions; and process one or more of the output elements using one or more output layers to generate a classification output for the image, and the method comprising:

obtaining first training data, the first training data comprising a plurality of training images and a respective target classification output for each training image; and training the vision Transformer neural network on the first training data, the training comprising:

during the training, updating parameters of the one or more output layers using a first weight decay value, and updating parameters of the plurality of self-attention neural network blocks using a second weight decay value, wherein the first weight decay value is higher than the second weight decay value, and wherein updating the parameters of the one or more output layers and the parameters of the one or more self-attention blocks comprises repeatedly performing the following:

computing, using one or more of the training examples, gradients of an objective function; and applying an optimizer to the gradients to generate a gradient-based update to the parameters, wherein the optimizer makes use of a respective momentum value for each of the parameters, and wherein the respective momentum values are stored with a reduced precision relative to the parameters.

2. The method of claim 1, wherein the first weight decay value is greater than or equal to .3 while the second weight decay value is less than .3.

3. The method of claim 2, wherein the first weight decay value is greater than or equal to 3.0.

4. The method of claim 3, wherein the second weight decay value is less than or equal to . 1.

5. The method of claim 1, wherein each input element in the input sequence corresponds to a respective one of the image patches, and wherein the one or more output layers comprise:

an aggregation layer block that is configured to aggregate all of the output elements to generate an aggregated output element; and one or more final output layers that are configured to generate the classification output from the aggregated output element.

6. The method of claim 5, wherein the one or more final output layers are a single linear layer that is configured to map the aggregated output element to the classification output.

7. The method of claim 5, wherein the aggregation block is configured to apply multihead attention pooling to the output elements to generate the aggregated output element.

8. The method of claim 5, wherein the aggregation block is configured to apply global average pooling to the output elements to generate the aggregated output element.

9. The method of claim 1, wherein the training further comprises:

during an initial phase of the training, linearly annealing a learning-rate for the parameters of the output layers and the self-attention blocks away from zero;

during a final phase of the training, linearly annealing the learning-rate toward zero; and during a main phase of the training that is between the initial phase and the final phase, applying a schedule that prevents the learning-rate from reaching zero.

10. The method of claim 1, wherein the respective momentum values are stored with half-precision relative to the parameters.

11. The method of claim 1, further comprising:

after training the vision Transformer on the first training data, training the plurality of self-attention neural network blocks jointly with a different set of one or more output layers on second training data to perform a different, downstream task.

12. One or more non-transitory computer storage media storing instructions that when executed by one or more computers cause the one more computers to perform operations for training a vision Transformer neural network, the vision Transformer neural network configured to:

obtain a plurality of image patches of an image, wherein each image patch comprises a different subset of the pixels of the image;

process the plurality of image patches to generate an input sequence comprising a respective input element at each of a plurality of positions, wherein the input sequence includes a respective input element corresponding to each of the plurality of image patches;

process the input sequence through a plurality of self-attention neural network blocks to generate an output sequence comprising a respective output element at each of the positions; and process one or more of the output elements using one or more output layers to generate a classification output for the image, and the method comprising:

obtaining first training data, the first training data comprising a plurality of training images and a respective target classification output for each training image; and training the vision Transformer neural network on the first training data, the training comprising:

during the training, updating parameters of the one or more output layers using a first weight decay value, and updating parameters of the plurality of self-attention neural network blocks using a second weight decay value, wherein the first weight decay value is higher than the second weight decay value, and wherein updating the parameters of the one or more output layers and the parameters of the one or more self-attention blocks comprises repeatedly performing the following:

computing, using one or more of the training examples, gradients of an objective function; and applying an optimizer to the gradients to generate a gradient-based update to the parameters, wherein the optimizer makes use of a respective momentum value for each of the parameters, and wherein the respective momentum values are stored with a reduced precision relative to the parameters.

13. A system comprising one or more computers and one or more storage devices storing instructions that when executed cause the one more computers to perform operations for training a vision Transformer neural network, the vision Transformer neural network configured to:

obtain a plurality of image patches of an image, wherein each image patch comprises a different subset of the pixels of the image;

process the plurality of image patches to generate an input sequence comprising a respective input element at each of a plurality of positions, wherein the input sequence includes a respective input element corresponding to each of the plurality of image patches;

process the input sequence through a plurality of self-attention neural network blocks to generate an output sequence comprising a respective output element at each of the positions; and process one or more of the output elements using one or more output layers to generate a classification output for the image, and the method comprising:

obtaining first training data, the first training data comprising a plurality of training images and a respective target classification output for each training image; and training the vision Transformer neural network on the first training data, the training comprising:

during the training, updating parameters of the one or more output layers using a first weight decay value, and updating parameters of the plurality of self-attention neural network blocks using a second weight decay value, wherein the first weight decay value is higher than the second weight decay value, and where in updating the parameters of the one or more output layers and the parameters of the one or more self-attention blocks comprises repeatedly performing the following:

computing, using one or more of the training examples, gradients of an objective function; and applying an optimizer to the gradients to generate a gradient-based update to the parameters, wherein the optimizer makes use of a respective momentum value for each of the parameters, and where in the respective momentum values are stored with a reduced precision relative to the parameters.

14. The system of claim 13, wherein the first weight decay value is greater than or equal to .3 while the second weight decay value is less than .3.

15. The system of claim 14, wherein the first weight decay value is greater than or equal to 3.0.

16. The system of claim 15, wherein the second weight decay value is less than or equal to .1.

17. The system of claim 13, wherein each input element in the input sequence corresponds to a respective one of the image patches, and wherein the one or more output layers comprise:

an aggregation layer block that is configured to aggregate all of the output elements to generate an aggregated output element; and one or more final output layers that are configured to generate the classification output from the aggregated output element.

18. The system of claim 13, the operations further comprising:

after training the vision Transformer on the first training data, training the plurality of self-attention neural network blocks jointly with a different set of one or more output layers on second training data to perform a different, downstream task.

19. The system of claim 13, wherein the respective momentum values are stored with half-precision relative to the parameters.

20. The system of claim 13, wherein the training further comprises:

during an initial phase of the training, linearly annealing a learning-rate for the parameters of the output layers and the self-attention blocks away from zero;

during a final phase of the training, linearly annealing the learning-rate toward zero; and during a main phase of the training that is between the initial phase and the final phase, applying a schedule that prevents the learning-rate from reaching zero.

* * * * *